UNITED STATES PATENT OFFICE.

ALEXANDER CLASSEN, OF AACHEN, GERMANY, ASSIGNOR TO CLASSEN-LIGNUM COMPANY, A CORPORATION OF NEW JERSEY.

PROCESS OF CONVERTING CELLULOSE OF WOOD INTO FERMENTABLE SUGARS.

No. 825,808.      Specification of Letters Patent.      Patented July 10, 1906.

Application filed April 17, 1905. Serial No. 256,104.

*To all whom it may concern:*

Be it known that I, ALEXANDER CLASSEN, of the city of Aachen, Prussia, in the Empire of Germany, have invented certain new and useful Improvements in Processes of Converting Cellulose of Wood into Fermentable Sugars; and I do hereby declare that the following is a full, clear, and exact description of the same.

My invention relates to a process of treating cellulose of wood and the like, whereby the conversion of cellulose into fermentable sugars or glucose is effected and a high degree of fermentability of such glucose or sugar obtained, so as to enable the largest possible amount of alcohol or spirit to be obtained therefrom.

In my prior patent, reissued December 30, 1902, No. 12,069, I have described a process of converting cellulose into sugar by the treatment of comminuted wood or other cellulosic material to the action of sulfurous and sulfuric acids in a closed vessel under heat and pressure. This process is fully set forth in the patent referred to and requires no specific description here.

The inversion of cellulosic material has, however, been practically effected hitherto only on employing pine or other materials containing little or no tannic acid. Such materials under my process, as described in my prior patent, give sugar solutions which ferment substantially as quickly as do the solutions of pure glucose. I am not aware, however, of the existence of any process for the inversion of woods containing large or small quantities of tannic acid—such as oak, chestnut, poplar, beech, birch, or the like, which will produce a solution which does not, according to the nature of the wood, show an inferior degree of fermentation as compared with pine. I have found that the difference between the fermentation of sugar solution from pine and sugar solutions from tannic woods, such as these mentioned above, is due to the fact that the gallic acid formed by the transformation of tannic acid exercises an injurious action upon the fermentation of sugar solutions, so that a smaller yield of alcohol is obtained, although the absolute quantity of sugar is increased by the tannic acid splitting into gallic acid and sugar. This transformation of the tannic acid into gallic acid and sugar takes place during the treatment of the material by the application of heat and the action of the sulfurous acid as above described. A portion of the tannic acid, however, may remain in the sugar solution. I have therefore found that it is very desirable to eliminate the gallic acid from the sugar solution and that when the gallic acid is eliminated fermentation will take its regular course.

The presence of gallic acid in the sugar solution obtained can be recognized, for example, by the more or less blue color produced on adding ferric salt to the solution. By removing the tannic and gallic acid from the sugar solution obtained from tannic woods such sugar solution becomes fermentable upon a commercial scale. In other words, the fermentability of the sugars or glucose obtained from the tannic woods is thus increased until it may be accomplished with substantially the same degree of success as that obtained from pine, and the fermentation by means of yeast in any desired ordinary or known manner and the ultimate conversion into spirit or alcohol by distillation or in any ordinary and known manner may be readily accomplished in the same way as in the case of materials obtained from pine or other materials containing little or no tannic acid and with substantially the same degree of success. I therefore remove the gallic acid by precipitating it in the form of an insoluble compound, which is preferably formed by the combination of the gallic acid with a metal. Iron may be employed for this purpose. When employing iron, by adding some ferric salt—for instance, ferric sulfate—to the glucose or sugar solution only a small part of the iron gallate formed is precipitated by neutralizing the acid with calcium carbonate. In order to precipitate the gallic acid, the free acid is neutralized by adding calcium carbonate after the addition of the metal, then adding calcium hydroxid or other suitable hydroxid in the pulverized or levigated state in small portions at a time until the solution shows a slight alkaline reaction. The precipitate formed contains in addition to the calcium sulfate and iron gallate ferric hydroxid and may, owing to the latter, be employed for treating fresh tannic solutions.

The solution obtained should be slightly acidified with sulfuric acid before fermenting.

I claim—

1. The process of treating fermentable sugar solutions obtained from hard woods which consists in removing the tannic and gallic acids from the solutions by combining with the acids a suitable metal to form an insoluble compound.

2. The process of treating fermentable sugar solutions obtained from hard woods which consists in removing the tannic and gallic acids from the solutions by combining with the acids a suitable metal to form an insoluble compound and precipitating the compound thus formed.

3. The process of removing tannic and gallic acid from sugar solutions, which consists in combining the acid with a suitable metal to form an insoluble compound and partly precipitating the compound thus formed by adding to the solution a quantity of calcium carbonate.

4. The process of removing tannic and gallic acid from sugar solutions, which consists in first combining the acid with a suitable metal to form an insoluble compound, then precipitating the compound thus formed by the addition of calcium carbonate, and then adding calcium hydroxid in a pulverized or dissolved state.

5. The process of removing tannic and gallic acid from sugar solution, which consists in first combining the acid contained in the solution with a metal by adding ferric sulfate solution, then adding calcium carbonate, and finally adding calcium hydroxid in a pulverized or dissolved state in small portions at a time until the resultant solution shows an alkaline reaction.

ALEXANDER CLASSEN.

Witnesses:
GERARD OELLERS,
HENRY QUADFLIEG.